(12) United States Patent
Boos

(10) Patent No.: US 7,848,715 B2
(45) Date of Patent: Dec. 7, 2010

(54) CIRCUIT AND METHOD

(75) Inventor: Zdravko Boos, München (DE)

(73) Assignee: Infineon Technologies AG, Neubiberg (DE)

( * ) Notice: Subject to any disclaimer, the term of this patent is extended or adjusted under 35 U.S.C. 154(b) by 702 days.

(21) Appl. No.: 11/743,964

(22) Filed: May 3, 2007

(65) Prior Publication Data

US 2008/0274703 A1    Nov. 6, 2008

(51) Int. Cl.
H04B 1/02    (2006.01)

(52) U.S. Cl. .................. 455/91; 455/86; 455/73; 455/522; 370/318; 375/376

(58) Field of Classification Search .............. 455/91, 455/86, 73, 522, 76, 571, 572, 574, 127.1, 455/127.5; 370/318; 375/376, 336
See application file for complete search history.

(56) References Cited

U.S. PATENT DOCUMENTS

| | | | | |
|---|---|---|---|---|
| 3,633,191 A | * | 1/1972 | Engelhardt et al. | 340/870.11 |
| 3,748,655 A | * | 7/1973 | Engelhardt et al. | 340/870.11 |
| 4,328,494 A | * | 5/1982 | Goodall | 340/870.18 |
| 5,237,261 A | * | 8/1993 | Haapakoski | 323/282 |
| 5,452,290 A | | 9/1995 | Mihm, Jr. | |
| 5,568,369 A | * | 10/1996 | Ohms et al. | 363/26 |
| 5,568,448 A | * | 10/1996 | Tanigushi et al. | 367/82 |
| 5,569,307 A | * | 10/1996 | Schulman et al. | 607/56 |
| 5,594,454 A | * | 1/1997 | Devereux et al. | 342/357.09 |
| 5,606,739 A | * | 2/1997 | Goto | 455/343.3 |
| 5,822,200 A | * | 10/1998 | Stasz | 363/21.18 |
| 5,876,425 A | * | 3/1999 | Gord et al. | 607/56 |
| 6,011,440 A | * | 1/2000 | Bell et al. | 330/297 |
| 6,028,946 A | * | 2/2000 | Jahne | 381/122 |
| 6,031,742 A | * | 2/2000 | Journeau | 363/60 |
| 6,198,258 B1 | | 3/2001 | Ando et al. | |
| 6,298,246 B1 | | 10/2001 | Lysejko et al. | |
| 6,359,558 B1 | * | 3/2002 | Tsui | 340/531 |
| 6,366,622 B1 | * | 4/2002 | Brown et al. | 375/322 |
| 6,448,751 B1 | * | 9/2002 | Becker | 323/284 |
| 6,463,266 B1 | * | 10/2002 | Shohara | 455/196.1 |
| 6,509,777 B2 | * | 1/2003 | Razavi et al. | 327/307 |
| 6,898,492 B2 | * | 5/2005 | de Leon et al. | 701/35 |
| 7,050,772 B2 | * | 5/2006 | Herzberg et al. | 455/191.3 |
| 7,092,676 B2 | * | 8/2006 | Abdelgany et al. | 455/76 |
| 7,127,370 B2 | * | 10/2006 | Kelly et al. | 702/151 |
| 7,200,369 B2 | * | 4/2007 | Kim et al. | 455/114.3 |
| 7,276,966 B1 | * | 10/2007 | Tham et al. | 330/136 |
| 7,440,511 B2 | * | 10/2008 | Staszewski et al. | 375/295 |
| 7,551,098 B1 | * | 6/2009 | Chock et al. | 340/660 |

(Continued)

FOREIGN PATENT DOCUMENTS

JP    2007060579 A    3/2007

OTHER PUBLICATIONS

"High-Performance Differential VCO Based on Armstrong Oscillator Topology", Nikolay T. Tchamov, Tero Niemi and Niko Mikkola, IEEE Journal of Solid-State Circuits, vol. 36, No. 1, Jan. 2001, pp. 139-141.

(Continued)

Primary Examiner—Minh D Dao
(74) Attorney, Agent, or Firm—Eschweiler & Associates, LLC

(57) ABSTRACT

Implementations related to circuits including an oscillator and a switch-mode DC/DC converter are presented herein.

8 Claims, 3 Drawing Sheets

U.S. PATENT DOCUMENTS

| | | | |
|---|---|---|---|
| 2002/0111152 A1* | 8/2002 | Razavi et al. | 455/326 |
| 2002/0163440 A1* | 11/2002 | Tsui | 340/825.69 |
| 2003/0087617 A1* | 5/2003 | Shohara | 455/192.2 |
| 2003/0193923 A1* | 10/2003 | Abdelgany et al. | 370/342 |
| 2004/0152427 A1* | 8/2004 | Chiu et al. | 455/85 |
| 2004/0217748 A1 | 11/2004 | Andrews | |
| 2006/0126754 A1* | 6/2006 | Filimonov et al. | 375/296 |
| 2007/0152872 A1* | 7/2007 | Woodington | 342/159 |
| 2007/0152874 A1* | 7/2007 | Woodington | 342/159 |
| 2007/0195722 A1* | 8/2007 | Hiramoto | 370/318 |
| 2009/0206941 A1* | 8/2009 | Wang et al. | 332/119 |
| 2010/0012373 A1* | 1/2010 | Guo et al. | 174/72 A |

OTHER PUBLICATIONS

"A Low-Voltage CMOS DC-DC Converter for a Portable Battery-Operated System", Anthony J. Stratakos, Seth R. Sanders and Robert W. Brodersen, IEEE, 1994, pp. 619-626.

* cited by examiner

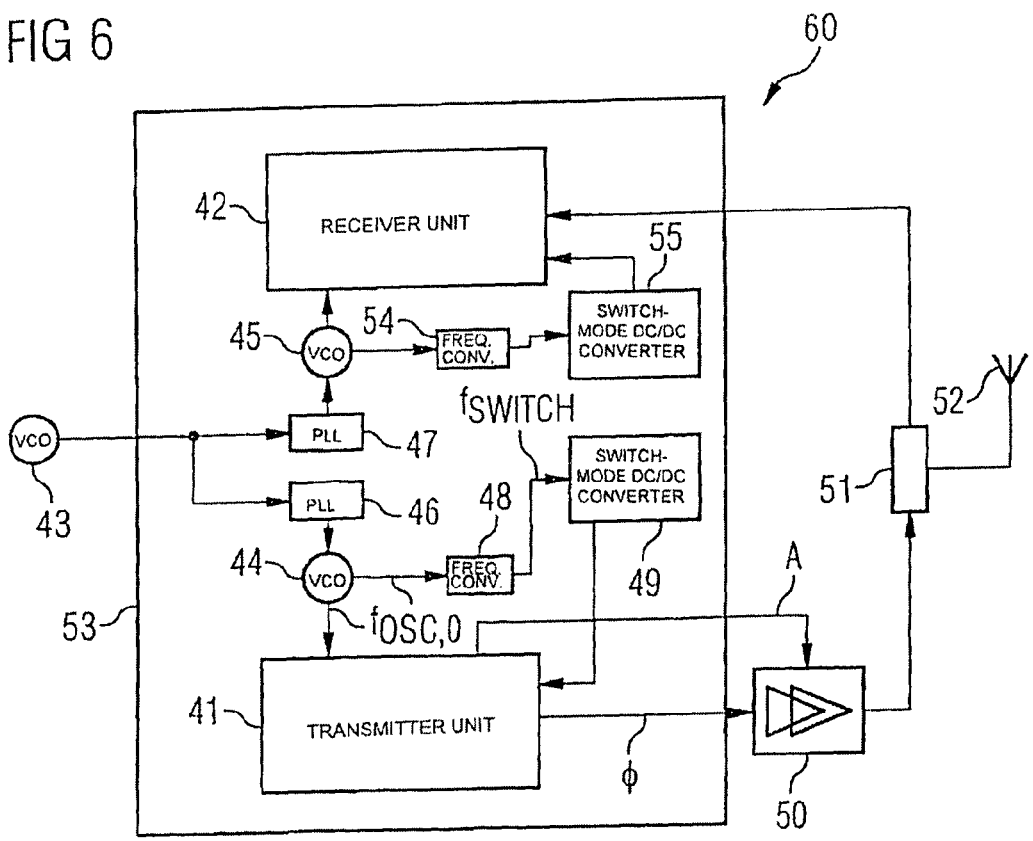
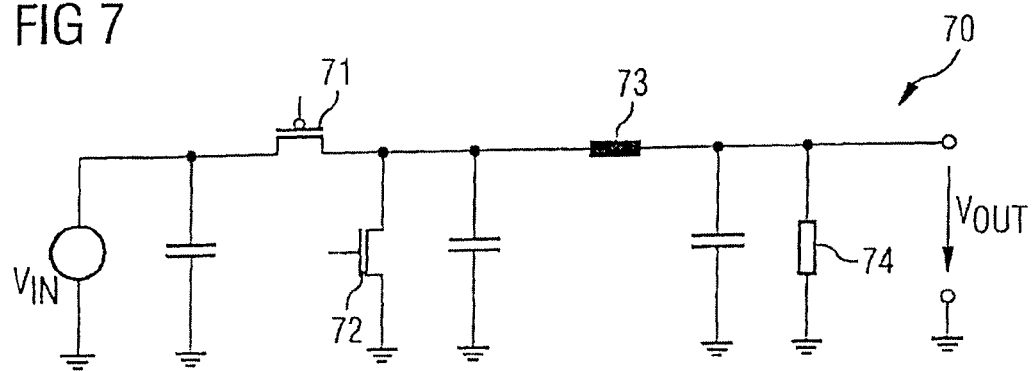

US 7,848,715 B2

CIRCUIT AND METHOD

FIELD OF THE INVENTION

This invention relates to circuits comprising an oscillator and a switch-mode DC/DC converter. Moreover, the invention relates to a transmitter circuit, a receiver circuit and a transceiver circuit.

BACKGROUND OF THE INVENTION

Radio transmitter and receiver circuits usually comprise frequency synthesizers to generate up-conversion frequencies and down-conversion frequencies that are used to up-convert signals to be transmitted and down-convert received signals, respectively. The frequency synthesizers may be implemented comprising a voltage-controlled oscillator (VCO) or a digitally controlled oscillator (DCO). Further, for operating the transmitter and receiver circuits a supply voltage is required. The supply voltage is often provided by a DC/DC converter which, for example, converts a battery voltage to a lower supply voltage. The DC/DC converter may be a switch-mode DC/DC converter which performs the voltage conversion by applying a DC voltage across an inductor or capacitor for a period of time which causes current to flow and store energy magnetically or electrically, then switching this voltage off and causing the stored energy to be transferred to the output of the converter in a controlled manner.

BRIEF DESCRIPTION OF THE SEVERAL VIEWS OF THE DRAWINGS

FIG. 6 schematically illustrates a transceiver circuit 60 according to yet a further exemplary embodiment.

FIG. 7 schematically illustrates an example of a switch-mode DC/DC converter.

DETAILED DESCRIPTION OF THE INVENTION

Figure 1:
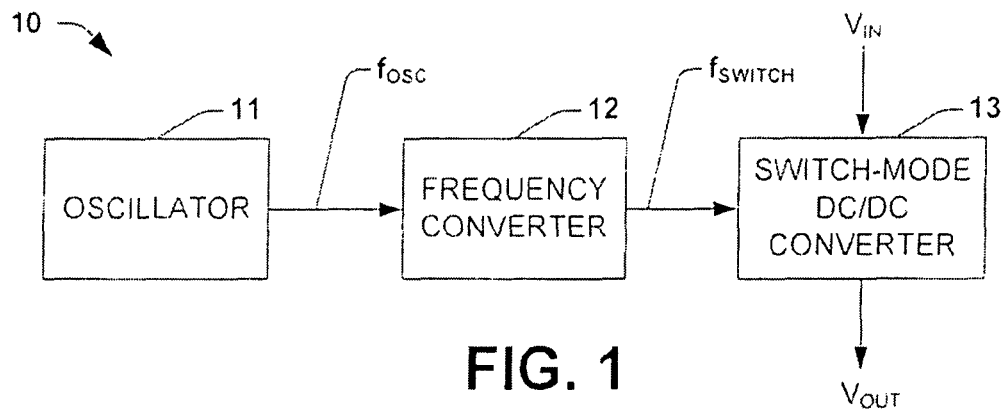
FIG. 1 schematically illustrates a circuit according to an exemplary embodiment.

In the following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

FIG. 1 shows a schematic circuit diagram of a circuit 10 according to an exemplary embodiment. The circuit 10 comprises an oscillator 11, a frequency converter 12 and a switch-mode DC/DC converter 13. The oscillator 11 may be a controlled oscillator and generates a signal having a frequency $f_{OSC}$. The signal of the frequency $f_{OSC}$ is fed into the frequency converter 12 which converts this signal to a signal having a frequency $f_{SWITCH}$. The DC/DC converter 13 converts an input voltage $V_{IN}$ to an output voltage $V_{OUT}$. The DC/DC converter 13 is controlled by the signal of the frequency $f_{SWITCH}$ that is output by the frequency converter 12. The frequency $f_{SWITCH}$ is, for example, the switching frequency of the DC/DC converter 13.

Figure 2:
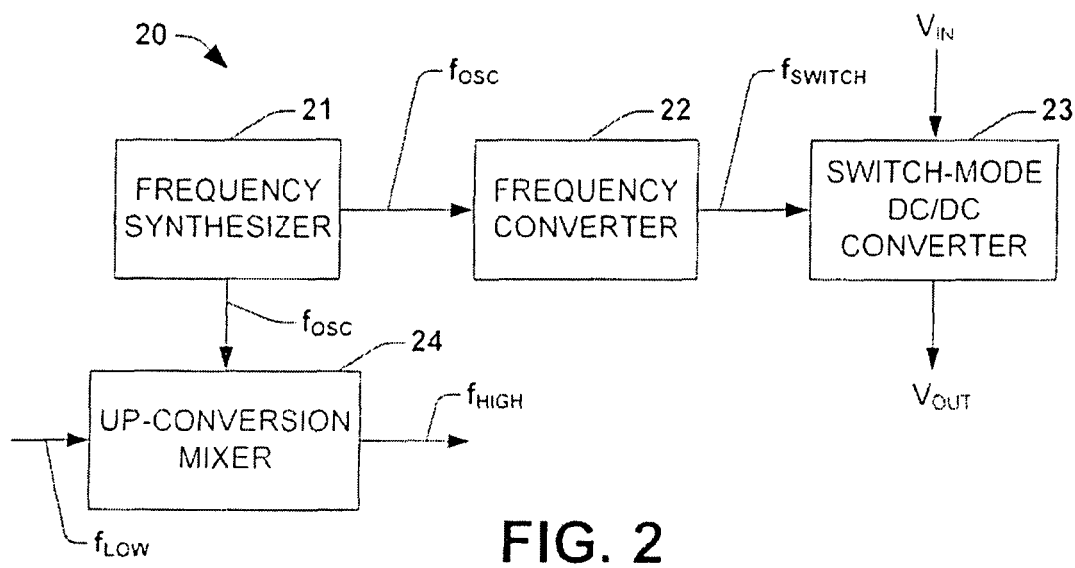
FIG. 2 schematically illustrates a transmitter circuit according to a further exemplary embodiment.

Referring to FIG. 2, a transmitter circuit 20 is schematically illustrated which serves as a further exemplary embodiment. The circuit 20 comprises a frequency synthesizer 21, a frequency converter 22, a switch-mode DC/DC converter 23 and an up-conversion mixer 24. The wiring and the functions of the frequency converter 22 and the switch-mode DC/DC converter 23 are the same as the ones of the frequency converter 12 and the switch-mode DC/DC converter 13 of the circuit 10, respectively. Furthermore, the frequency synthesizer 21 supplies the signal of the frequency $f_{OSC}$ to the up-conversion mixer 24. The up-conversion mixer 24 uses this signal to mix it with a signal to be transmitted, thereby up-converting the frequency of the signal to be transmitted from a lower frequency $f_{LOW}$ to a higher frequency $f_{HIGH}$.

Figure 3:
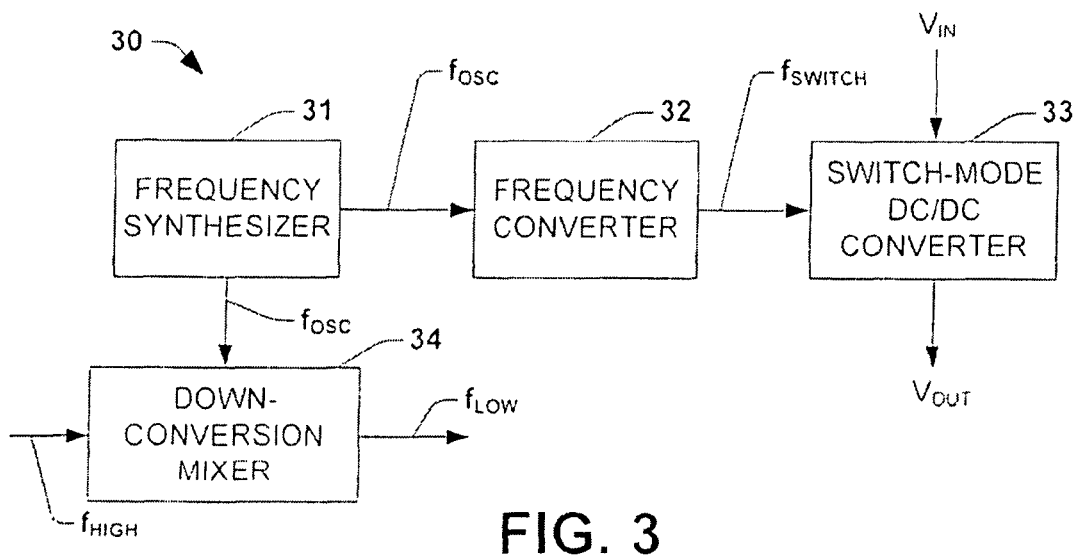
FIG. 3 schematically illustrates a receiver circuit according to a further exemplary embodiment.

FIG. 3 shows a schematic circuit diagram of a receiver circuit 30 according to yet a further exemplary embodiment. The circuit 30 comprises a frequency synthesizer 31, a frequency converter 32, a switch-mode DC/DC converter 33 and a down-conversion mixer 34. The wiring and the functions of the components of the receiver circuit 30 are the same as the ones of the components of the transmitter circuit 20 with the exception that the down-conversion mixer 34 uses the signal of the frequency $f_{OSC}$ to down-convert a received signal from a higher frequency $f_{HIGH}$ to a lower frequency $f_{LOW}$.

The transmitter circuit 20 and the receiver circuit 30 may be based on a direct conversion concept meaning that baseband signals are up-converted to a transmission frequency in a single operation and incoming radio frequency signals are down-converted to baseband without going to an intermediate frequency. Alternatively, in another embodiment the transmitter circuit 20 and the receiver circuit 30 may use an intermediate frequency for up- and down-converting signals, respectively.

The following possible embodiments as described may be realized in the circuit 10, the transmitter circuit 20 and the receiver circuit 30. According to one embodiment, the frequency $f_{SWITCH}$ is locked to the frequency $f_{OSC}$ meaning that the frequency $f_{SWITCH}$ follows any change of the frequency $f_{OSC}$. For example, the frequency converters 12, 22 and 32 may multiply the frequency $f_{OSC}$ with a pre-determined constant $\alpha$ to obtain the frequency $f_{SWITCH}$:

$$f_{SWITCH} = \alpha * f_{OSC} \quad (1)$$

wherein the constant $\alpha$ may be the ratio of two integers M and N:

$$\alpha = M/N \quad (2)$$

Multiplication with the integer M and division by the integer N may be implemented by using multipliers and dividers in one embodiment. Moreover, in one embodiment a PLL (phase locked loop) may be used to lock the frequency $f_{SWITCH}$ to the frequency $f_{OSC}$.

As an alternative embodiment to the multiplication with the constant $\alpha$, the frequency converters 12, 22 and 32 may add a pre-determined frequency $f_{OFFSET}$ to the frequency $f_{OSC}$ to obtain the frequency $f_{SWITCH}$:

$$f_{SWITCH} = f_{OSC} + f_{OFFSET} \quad (3)$$

In one embodiment the oscillator 11 and the frequency synthesizers 21 and 31 may comprise a voltage-controlled oscillator and/or a digitally controlled oscillator.

In one embodiment the oscillator 11 and the DC/DC converter 13 of the circuit 10 may be monolithically integrated on the same substrate. Analogously, the frequency synthesizer 21, 31 and the DC/DC converter 23, 33 may be integrated in the same integrated circuit. The other components of the circuits 10, 20 and 30 may also be part of these integrated circuits. Furthermore, the transmitter circuit 20 and the receiver circuit 30 may be combined to a transceiver and may be integrated on the same substrate.

The switch-mode DC/DC converters 13, 23 and 33 may be self-oscillating in one embodiment. In this case the DC/DC converters 13, 23 and 33 can be still working, even if the oscillator 11 or the frequency synthesizers 21 and 31 are not active.

Figure 4:
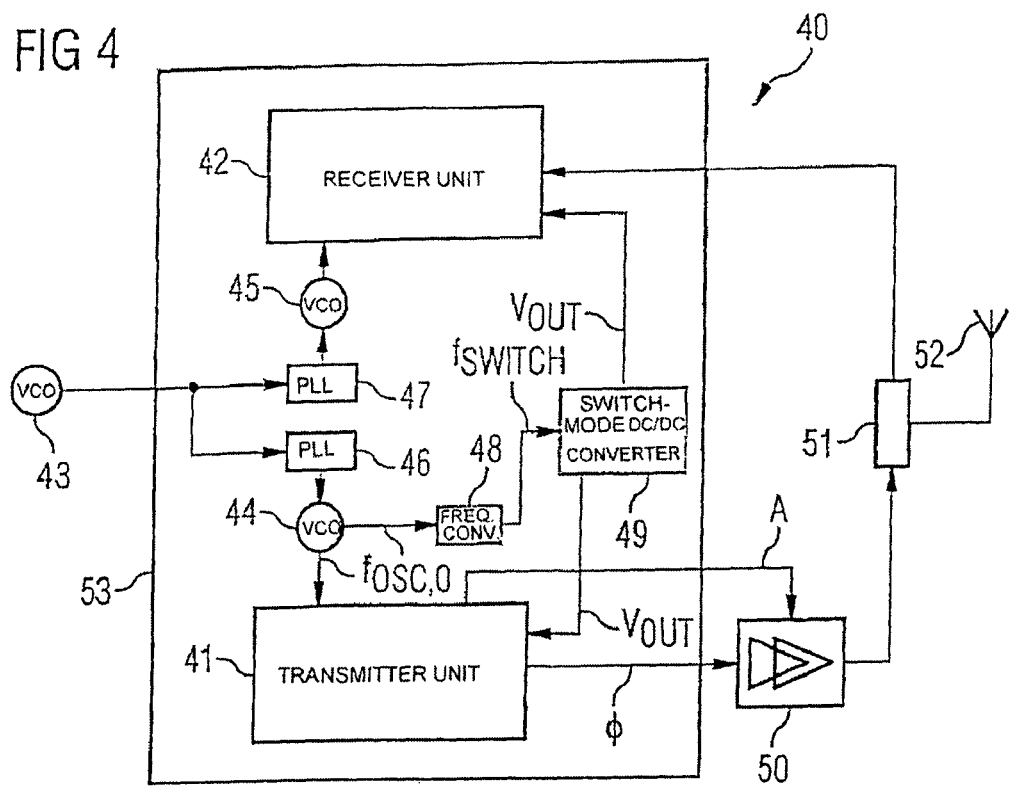
FIG. 4 schematically illustrates a transceiver circuit according to yet a further exemplary embodiment.

Referring to FIG. 4, a transceiver circuit 40 is schematically illustrated which serves as a further exemplary embodiment. The transceiver circuit 40 comprises a transmitter unit 41, a receiver unit 42, VCOs 43, 44 and 45, PLLs 46 and 47, a frequency converter 48, a switch-mode DC/DC converter 49, a power amplifier 50, a duplexer 51 and an antenna 52.

The VCO 43 generates a reference signal which is inputted in the PLLs 46 and 47. The PLLs 46 and 47 produce output signals which control the VCOs 44 and 45, respectively. The output signals of the VCOs 44 and 45 are inputs to the transmitter unit 41 and the receiver unit 42, respectively.

In the transmitter unit 41 the output signal of the VCO 44 is used to up-convert signals to be transmitted. Since the transmitter unit 41 contains a polar transmitter circuit, the complex baseband signals to be transmitted are transformed to a polar form, and the amplitude signals and phase signals are processed separately. The phase signals are converted to modulated radio-frequency signals Φ by means of the signal supplied by the VCO 44. The amplitude signals A and the modulated radio-frequency phase signals Φ are fed into the power amplifier 50, in whose output stage the radio-frequency phase signals Φ are amplitude-modulated with the aid of the amplitude signals A. The output signals of the power amplifier 50 are transmitted via the antenna 52.

Radio-frequency signals which are received by the antenna 52 are fed into the receiver unit 42 and are down-converted using the output signal of the VCO 45. The output signals of the VCOs 44 and 45 may also be used for further purposes in the transmitter and receiver units 41 and 42.

The output signal of the VCO 44 having a frequency $f_{OSC,0}$ is also fed into the frequency converter 48. According to equations (1) and (2), the frequency converter 48 converts the output signal of the VCO 44 to a signal having a frequency $f_{SWITCH}$. The frequency $f_{SWITCH}$ at the output of the frequency converter 48 may have a relation with the frequency $f_{OSC,0}$ generated by the VCO 44 as, for example, ¾ or ⅔ or other M/N ratios, wherein M and N are integers and N is not equal to M (M, N=1, 2, ... 10). The output terminal of the frequency converter 48 is connected to a control terminal of the DC/DC converter 49. The signal of the frequency $f_{SWITCH}$ controls the switching frequency of the DC/DC converter 49.

Figure 5A:
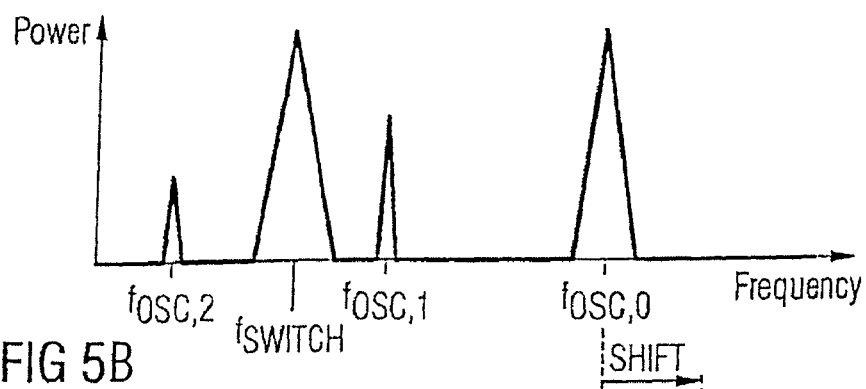
FIGS. 5A and 5B are graphs that illustrate frequency spectrums of a voltage-controlled oscillator and the switching frequency of a switch-mode DC/DC converter.
Figure 5B:
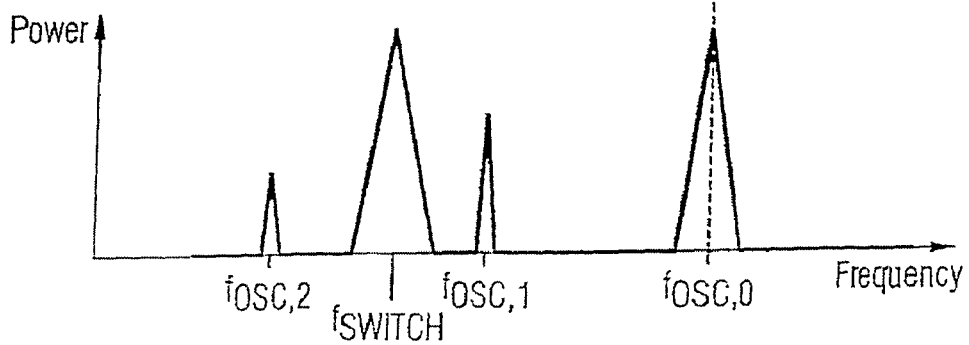

The ratio M/N is chosen in a manner that the switching frequency $f_{SWITCH}$ of the DC/DC converter 49 is not inside the bandwidth of the VCO frequency and is not an integer of harmonics or sub-harmonics of the VCO frequency. This is schematically illustrated in one example in FIG. 5A. There the frequency spectrum of the VCO 44 around the frequency $f_{OSC,0}$ and its harmonics at frequencies $f_{OSC,1}$ and $f_{OSC,2}$ are shown. The frequency spectrum of the switching frequency $f_{SWITCH}$ does not overlap with the frequency spectrums around the frequencies $f_{OSC,0}$, $f_{OSC,1}$ and $f_{OSC,2}$. Since the switching frequency $f_{SWITCH}$ of the DC/DC converter 49 is locked to the frequency $f_{OSC,0}$, the switching frequency $f_{SWITCH}$ follows any change of the frequency $f_{OSC,0}$. If a shift of the frequency $f_{OSC,0}$ occurs, the switching frequency $f_{SWITCH}$ will shift by the same amount as shown in FIG. 5B. Thus, once the ratio M/N has been correctly chosen, the frequency converter 48 prevents the switching frequency $f_{SWITCH}$ from overlapping with the frequencies $f_{OSC,0}$, $f_{OSC,1}$ and $f_{OSC,2}$.

The aforementioned behavior of the switching frequency $f_{SWITCH}$ is particularly advantageous in a case where the VCO 44 and the DC/DC converter 49 are fully integrated in the same integrated circuit 53, wherein the inductor and/or the capacitor of the DC/DC converter 49, which perform the voltage conversion, are also part of the integrated circuit. In this case the coupling of the switching frequency $f_{SWITCH}$ to the frequency $f_{OSC,0}$ prevents crosstalk between the VCO 44 and the DC/DC converter 49.

The DC/DC converter 49 may convert a battery supply voltage $V_{IN}$ in the range between 2.8 to 5.5 V to an output voltage $V_{OUT}$ of around 1 V or below. The output voltage $V_{OUT}$ is used as a supply voltage for the transceiver unit 41, the receiver unit 42 and other components of the integrated circuit 53. The switching frequency $f_{SWITCH}$ of the DC/DC converter 49 may be in the MHz or GHz range. The higher the switching frequency $f_{SWITCH}$ the smaller the coils and/or capacitors of the DC/DC converter 49 may be designed.

In another embodiment, instead of being coupled to the output terminal of the VCO 44, the frequency converter 48 may also be coupled to the output terminal of the VCO 45 feeding the receiver unit 42. In this case the switching frequency $f_{SWITCH}$ of the DC/DC converter 49 is coupled to the frequency generated by the VCO 45. Furthermore, the DC/DC converter 49 may be self-oscillating so that it is able to produce a switching frequency even if the VCO 44 or 45 is not active.

In FIG. 6 a transceiver circuit 60 is schematically illustrated which serves as a further exemplary embodiment. Most of the transceiver circuit 60 is identical to the transceiver circuit 40 shown in FIG. 4. In contrast to the transceiver circuit 40, the transceiver circuit 60 comprises a further frequency converter 54 and a further switch-mode DC/DC converter 55. The frequency converter 54 and the switch-mode DC/DC converter 55 are coupled to the VCO 45. The functions of the frequency converter 54 and the DC/DC converter 55 are the same as the ones of the frequency converter 48 and the DC/DC converter 49. The DC/DC converter 49 generates a supply voltage for the transmitter unit 41, whereas the DC/DC converter 55 generates a supply voltage for the receiver unit 42.

In FIG. 7 one simple example of a switch-mode DC/DC converter 70 is shown which may be used as the DC/DC converter 13, 23, 33, 49 or 55 in the exemplary embodiments described above. Two transistors 71 and 72 are employed as switches to energize an inductor 73 intermittently via an input DC voltage $V_{IN}$ so that an output voltage $V_{OUT}$ remains substantially constant. The inductor 73 is thus used as an energy-storage component delivering its stored energy to a load 74. The opening and closing of the transistors 71 and 72 are determined by the switching frequency $f_{SWITCH}$ as discussed above. Instead of the inductor 73 a capacitor may also be used to store the energy. If the DC/DC converter 70 is used in the circuits 10, 20, 30, 40 or 60, the DC/DC converter 70 and the corresponding frequency synthesizer may be integrated in the same integrated circuit. In this case the inductor 73 is also part of the integrated circuit.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A transmitter circuit, comprising:
    a frequency synthesizer to provide a first signal having a first frequency;
    an up-conversion mixer, coupled to the frequency synthesizer, to mix a signal to be transmitted with the first signal;
    a frequency converter, coupled to the frequency synthesizer, to convert the first signal to a second signal having a second frequency; and
    a switch-mode DC/DC converter, coupled to the frequency converter, to convert a first voltage to a second voltage, wherein the DC/DC converter is controlled by the second signal,
    wherein the second frequency is equal to the sum of the first frequency and an offset frequency.

2. The transmitter circuit of claim 1, wherein the second frequency is locked to the first frequency.

3. The transmitter circuit of claim 1, wherein the second frequency is M/N times the first frequency and M and N are integers.

4. The transmitter circuit of claim 1, wherein the first signal has a first frequency bandwidth and the second signal has a second frequency bandwidth, wherein the first and second frequency bandwidths do not overlap, and wherein the second signal is not an integer harmonic or subharmonic of the first signal.

5. A transmitter circuit, comprising:
    a frequency synthesizer to provide a first signal having a first frequency;
    an up-conversion mixer, coupled to the frequency synthesizer, to mix a signal to be transmitted with the first signal;
    a frequency converter, coupled to the frequency synthesizer, to convert the first signal to a second signal having a second frequency; and
    a switch-mode DC/DC converter, coupled to the frequency converter, to convert a first voltage to a second voltage, wherein the DC/DC converter is controlled by the second signal,
    wherein the frequency synthesizer and the DC/DC converter are integrated in the same integrated circuit.

6. A transmitter circuit, comprising:
    a frequency synthesizer to provide a first signal having a first frequency;
    an up-conversion mixer, coupled to the frequency synthesizer, to mix a signal to be transmitted with the first signal;
    a frequency converter, coupled to the frequency synthesizer, to convert the first signal to a second signal having a second frequency; and
    a switch-mode DC/DC converter, coupled to the frequency converter, to convert a first voltage to a second voltage, wherein the DC/DC converter is controlled by the second signal,
    wherein the frequency synthesizer comprises a voltage-controlled oscillator or a digitally controlled oscillator, and wherein the voltage-controlled oscillator or digitally controlled oscillator is controlled by a phase locked loop circuit.

7. The transmitter circuit of claim 6, wherein the phase locked loop circuit is configured to derive a clock signal from an oscillator, wherein the oscillator is configured to generate clock signals for the transmitter circuit and a receiver circuit.

8. A transmitter circuit, comprising:
    a frequency synthesizer to provide a first signal having a first frequency;
    an up-conversion mixer, coupled to the frequency synthesizer, to mix a signal to be transmitted with the first signal;
    a frequency converter, coupled to the frequency synthesizer, to convert the first signal to a second signal having a second frequency; and
    a switch-mode DC/DC converter, coupled to the frequency converter, to convert a first voltage to a second voltage, wherein the DC/DC converter is controlled by the second signal,
    wherein the DC/DC converter is self-oscillating and in particular stops self-oscillating when the second frequency is fed into the DC/DC converter.

* * * * *